United States Patent
Cho et al.

(10) Patent No.: US 7,489,668 B2
(45) Date of Patent: Feb. 10, 2009

(54) METHOD FOR TRANSMITTING A FRAME AT A HIGH RATE IN A WIRELESS LOCAL AREA NETWORK

(75) Inventors: Jin-Youn Cho, Seoul (KR); Chang-Woo Seo, Suwon-si (KR); Jin-Bong Chang, Daejeon (KR); Kyung-Hun Jang, Suwon-si (KR); Hyo-Sun Hwang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 492 days.

(21) Appl. No.: 10/898,778

(22) Filed: Jul. 26, 2004

(65) Prior Publication Data

US 2005/0030930 A1      Feb. 10, 2005

(30) Foreign Application Priority Data

Jul. 26, 2003      (KR)      .................. 10-2003-0051845

(51) Int. Cl.
*H04Q 7/22*      (2006.01)

(52) U.S. Cl. .............. 370/338; 370/395.21; 370/395.41; 370/392; 370/356; 370/216; 370/352; 370/229; 455/445

(58) Field of Classification Search ............ 370/395.21, 370/395.41, 338, 392, 356, 216, 352, 229; 455/445
See application file for complete search history.

(56) References Cited

U.S. PATENT DOCUMENTS

| | | | |
|---|---|---|---|
| 4,680,756 A | 7/1987 | Sugimoto et al. | |
| 5,987,011 A | 11/1999 | Toh | |
| 6,044,062 A | 3/2000 | Brownrigg et al. | |
| 2002/0082035 A1* | 6/2002 | Aihara et al. | ............... 455/518 |
| 2002/0085488 A1* | 7/2002 | Kobayashi | ................. 370/216 |
| 2003/0118027 A1 | 6/2003 | Lee et al. | |
| 2004/0156345 A1* | 8/2004 | Steer et al. | ................. 370/338 |

FOREIGN PATENT DOCUMENTS

| | | |
|---|---|---|
| EP | 1 081 896 | 3/2001 |
| JP | 2003-134139 | 5/2003 |
| WO | WO 99/11081 | 3/1999 |
| WO | WO 03/051009 | 6/2003 |

\* cited by examiner

*Primary Examiner*—Charles N Appiah
*Assistant Examiner*—Randy Peaches
(74) *Attorney, Agent, or Firm*—McNeely Bodendorf LLP

(57) ABSTRACT

A method for transmitting data at a high rate in a wireless LAN is provided. A wireless access point requests reliable node information from a wireless terminal having a transfer rate equal to or less than a predetermined transfer rate if data to be transmitted to the terminal occurs. The terminal produces a frame containing information related to reliable nodes that can communicate with the terminal and information of greatest transfer rates between the reliable nodes and the terminal, and transmits the frame to the access point. The access point selects an optimal relay node from the reliable nodes, based on the greatest transfer rates between the reliable nodes and the access point and transfer rates between the reliable nodes and the terminal, and determines if a relay gain exists when using the optimal node. If the relay gain exists, the access point performs relay transmission to the terminal; otherwise, it performs direct transmission to it.

9 Claims, 8 Drawing Sheets

METHOD FOR TRANSMITTING A FRAME AT A HIGH RATE IN A WIRELESS LOCAL AREA NETWORK

PRIORITY

This application claims priority to an application entitled "METHOD FOR TRANSMITTING FRAME AT HIGH RATE IN WIRELESS LOCAL AREA NETWORK", filed in the Korean Intellectual Property Office on Jul. 26, 2003 and assigned Serial No. 2003-51845, the contents of which are incorporated herein by reference.

BACKGROUND OF THE INVENTION

1. Field of the Invention

The present invention relates to a method for transmitting frames at a high rate, and more particularly to a method for transmitting frames at a high rate in a wireless Local Area Network (LAN).

2. Description of the Related Art

A LAN was developed as a wired network system in its initial stage. The LAN has been rapidly developed mainly by small and medium sized companies. Along with the rapid development of wireless communication technology, the LAN has been combined with wireless technology to develop a wireless LAN, which is currently in widespread use in a variety of areas.

The wireless LAN allows terminals to be used within a specified area no matter where they are located due to the fact they are wireless. The wireless LAN will now be described in detail with reference to FIG. 1.

FIG. 1 is a block diagram showing the configuration of a wireless LAN. In the wireless LAN, wireless terminals 110, 120, 130, 140 and 150 are located around an Access Point (AP) 100. The AP 100 can be connected to other networks. The wireless terminals 110 to 150 can communicate with each other inside the wireless LAN directly or via the access point 100. The wireless terminals 110 to 150 can communicate with external networks only through the access point 100.

Because they are wireless, each of the wireless terminals 110 to 150 is not always located in the same place. In other words, the locations of the wireless terminals 110 to 150 may be continually changed. As shown in FIG. 1, the wireless terminals 110 to 150 are located apart from the access point 100 by distances R1, R2, R3, R4 and R5, respectively. The distances R1 to R5 of the terminals 110 to 150 are different from each other. In the wireless environment, the wireless terminals 110 to 150 generally have different transfer rates depending on the distances R1 to R5. A wireless terminal with a shorter distance from the access point 100 has a higher transfer rate than a wireless terminal with a longer distance therefrom. Although the calculation of the transfer rate is not based only on the distance, the transfer rate generally decreases as the distance increases.

As described above, the first wireless terminal ST1 110 located at an initial distance of R1 may move to a location ST1 110-1 where it is at a distance of R-1. After moving to the location of distance R-1, the ST1 100-1 has a different transfer rate from its transfer rate before the movement. Accordingly, when a mobile terminal is in communication with the access point 100, the terminal must always report its transfer rate to the access point 100 and carry out data transmission based on the reported transfer rate.

SUMMARY OF THE INVENTION

Therefore, the present invention has been made to solve problems in the prior art, and it is an object of the present invention to provide a method for transmitting data to a wireless terminal at a high rate in a wireless LAN.

It is another object of the present invention to provide a method for transmitting data in a wireless LAN, which prevents data loss due to a lowered transfer rate between a wireless terminal and an access point in a wireless LAN.

It is yet another object of the present invention to provide a method for transmitting data in a wireless LAN, which allows a high rate data transmission to a wireless terminal in a poor channel environment.

In accordance with one aspect of the present invention, the above and other objects can be accomplished by the provision of a method for transmitting data in a wireless local area network, the method comprising the steps of a) requesting, from a wireless terminal by a wireless access point, information of reliable nodes having a transfer rate less than a predetermined threshold if data to be transmitted to the wireless terminal occurs in the wireless access point; b) producing, by the wireless terminal, a reliable node information frame containing both information related to reliable nodes capable of communicating with the wireless terminal over a wireless channel and information related to greatest allowable transfer rates between the reliable nodes and the wireless terminal, and transmitting the reliable node information frame from the wireless terminal to the wireless access point; c) determining, by the wireless access point, an optimal relay node selected from the reliable nodes, based on the greatest allowable transfer rates between the reliable nodes and the wireless access point and based on greatest allowable transfer rates between the reliable nodes and the wireless terminal, and determining if a relay gain exists; and d) performing relay transmission from the wireless access point to the wireless terminal if the relay gain exists, and performing direct transmission from the wireless access point to the wireless terminal if no relay gain exists.

In accordance with another aspect of the present invention, there is provided a method for transmitting a data frame by a wireless access point in a wireless local area network including the wireless access point and a plurality of wireless terminals, said wireless access point capable of transmitting a data frame to the plurality of wireless terminals over wireless channels, the method comprising the steps of a) requesting information related to reliable nodes from a wireless terminal having a transfer rate less than a predetermined threshold if data to be transmitted to the wireless terminal occurs; b) determining, upon receipt of a reliable node information frame as a response signal from the wireless terminal, an optimal relay node from among the reliable nodes, based on greatest allowable transfer rates between the reliable nodes and the wireless access point, and based on greatest allowable transfer rates between the reliable nodes and the wireless terminal; c) comparing relay transmission to the wireless terminal via the optimal relay node with direct transmission to the wireless terminal to determine if a relay gain exists; and d) performing relay transmission to the wireless terminal if the relay gain exists, and performing direct transmission to the wireless terminal if no relay gain exists.

In accordance with a further aspect of the present invention, there is provided a method for receiving a data frame by a wireless terminal in a wireless local area network including a wireless access point and a plurality of wireless terminals, said wireless access point capable of transmitting a data frame to the plurality of wireless terminals over wireless channels, the method comprising the steps of a) providing upon receipt of a reliable node information request from the wireless access point, a response signal containing information related to all nodes capable of communicating with the wireless terminal and information related to greatest allowable transfer rates between the wireless terminal and the nodes, each of all the nodes being associated with a corresponding one of said greatest allowable transfer rates; and b) receiving a data frame from one of the reliable nodes or from the wireless access point, producing a response signal to the data frame, and providing the response signal to the wireless access point.

In accordance with yet another aspect of the present invention, there is provided a method for relaying a data frame by a wireless terminal in a wireless local area network including a wireless access point and a plurality of wireless terminals, said wireless access point capable of transmitting a data frame to the plurality of wireless terminals over wireless channels, the method comprising the steps of a) analyzing upon receipt of a data frame from the wireless access point, checking a header of the received data frame to determine if the received data frame is a relay frame; and b) deleting a relay header and a relay flag from the received data frame if the received data frame is a relay frame, and transmitting the data frame to a destination address.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
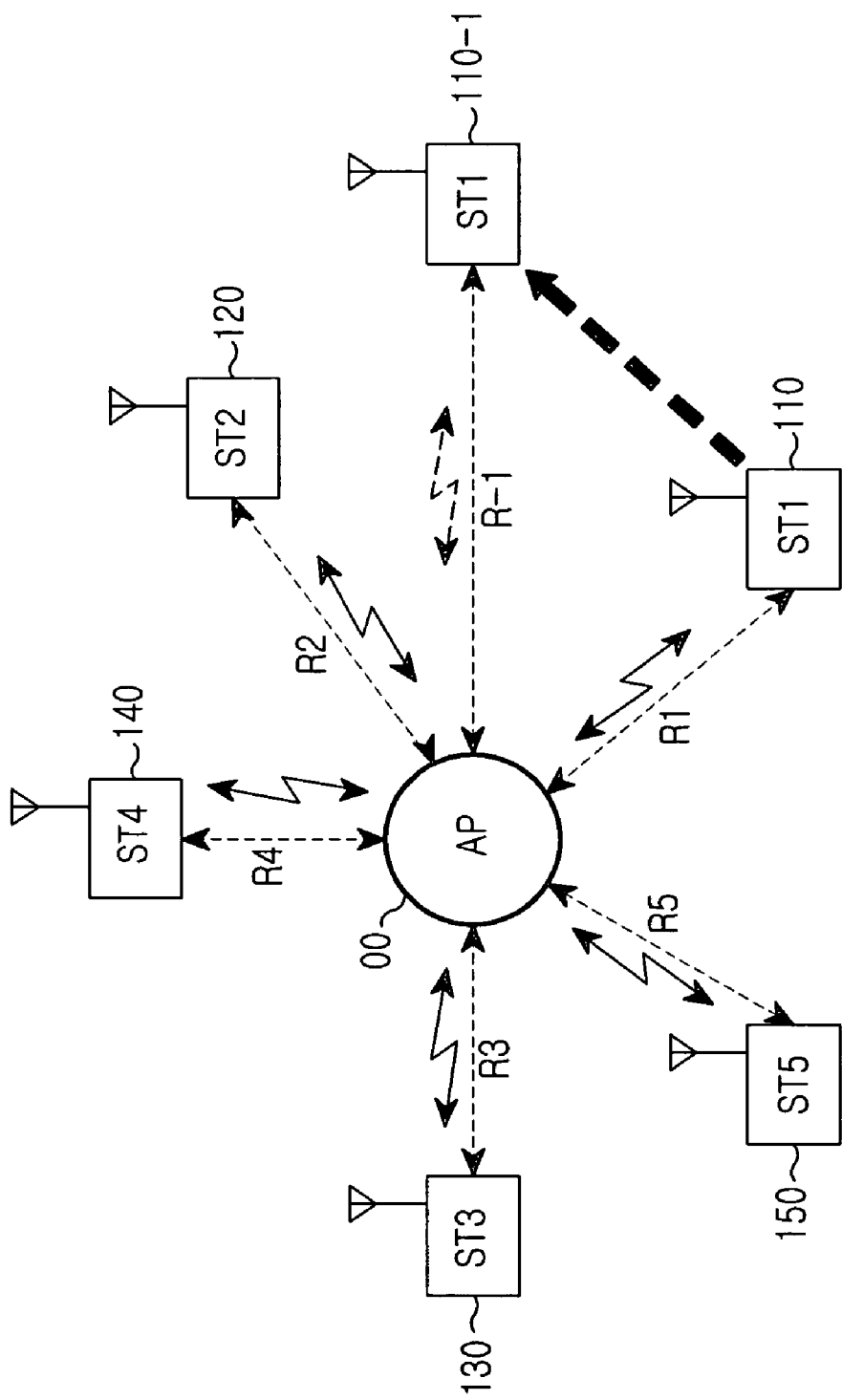
FIG. 1 is a block diagram showing the configuration of a wireless LAN.

Now, preferred embodiments of the present invention will be described in detail with reference to the annexed drawings.

In the drawings, the same or similar elements are denoted by the same reference numerals even though they are depicted in different drawings.

In the following description made in conjunction with preferred embodiments of the present invention, a variety of specific elements such as detailed messages or signals are shown. The description of such elements is provided only for a better understanding of the present invention. Those skilled in the art will appreciate that the present invention can be implemented without using the above-mentioned specific elements. In the following description of the present invention, a detailed description of known functions and configurations incorporated herein will be omitted when it may obscure the subject matter of the present invention.

In addition to the LAN described above, as the number of terminals in the LAN increases, the wireless LAN must transmit data at a higher rate. This is because if a specific wireless terminal continues to occupy the access point, the access point cannot communicate with other wireless terminals. If the occupation by the specific wireless terminal lasts a long time, data to be provided to other wireless terminals is continuously accumulated in the access point. If the accumulated data exceeds the capacity of a buffer provided in the access point 100, the accumulated data is lost, causing the need to request a retransmission to a wired network. In addition, if a large amount of data must be transmitted to a specific wireless terminal but the distance from the specific terminal increases or the channel environment with the specific terminal is poor, the data to be transmitted to the specific terminal is continuously accumulated in the access point. Also in this case, the data may exceed the capacity of the buffer provided in the access point 100, causing a data loss or the need to retransmit the data to the wired network.

Figure 2:
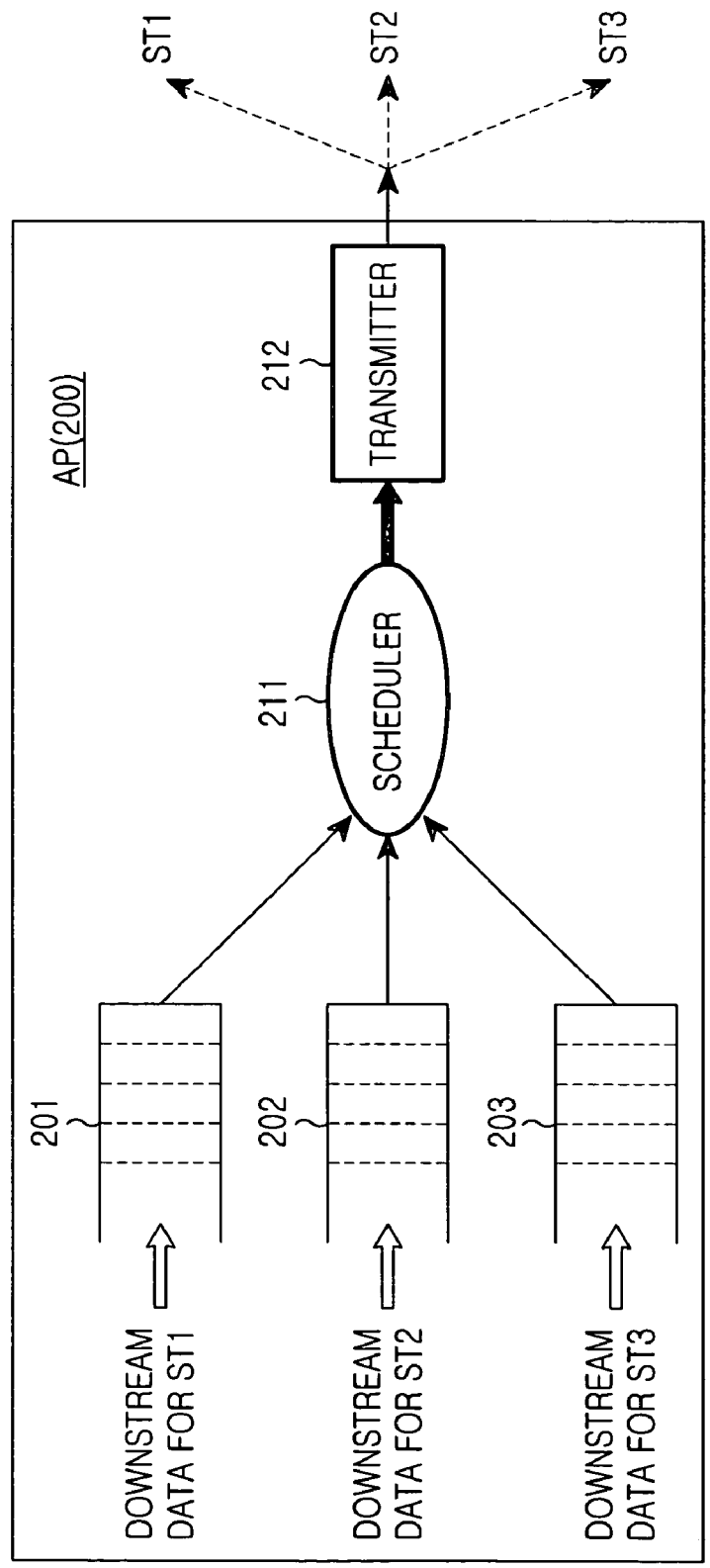
FIG. 2 is a functional block diagram showing the internal configuration of a wireless access point to which the present invention is applied.

FIG. 2 is a block diagram showing the internal configuration of a wireless access point to which the present invention is applied. The internal functional blocks of the wireless access point to which the present invention is applied will now be described in detail with reference to FIG. 2.

The following description will be given under the assumption that data is to be transmitted to three wireless terminals (i.e., first, second and third terminals ST1, ST2 and ST3) and occurs in the access point 200 shown in FIG. 2. Downstream data in the network to the first, second and third wireless terminals ST1, ST2 and ST3, respectively, is stored respectively in first, second and third buffers 201, 202 and 203 provided in the access point 200. Data frames corresponding to the data stored in the first to third buffers 201 to 203 are transmitted to the first to third terminals ST1 to ST3 at transfer rates determined by a scheduler 211. According to the present invention, if a specific wireless terminal has a transfer rate less than or equal to a predetermined threshold, the scheduler 211 determines if a relay transmission for the specific wireless terminal is possible. If it is possible the scheduler 211 then performs the relay transmission for the specific wireless terminal. The transmitter 212 transmits the data frames of the specific wireless terminal at its transfer rate determined by the scheduler 211. A super frame or a frame structure provided by the wireless LAN is already known in the art and a description thereof will be omitted.

Figure 3:
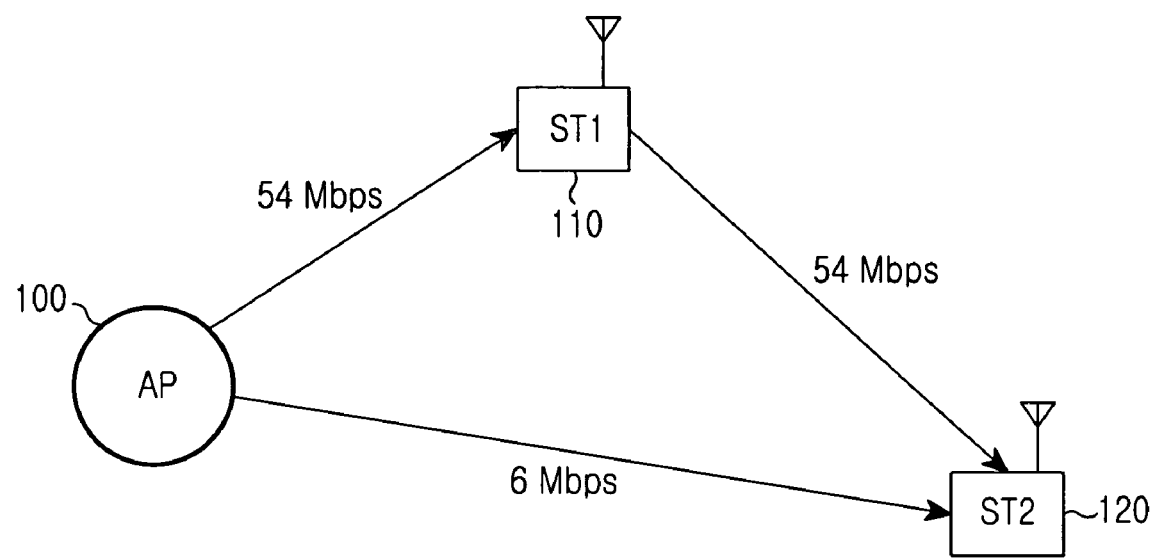
FIG. 3 is a diagram illustrating the case where there is a need to relay a data frame to a specific wireless terminal according to a preferred embodiment of the present invention.

FIG. 3 is a diagram illustrating the case where there is a need to relay a data frame to a specific wireless terminal according to a preferred embodiment of the present invention. A description will be given of the case where there is a need to relay a data frame to a specific wireless terminal, with reference to FIG. 3.

A wireless access point 100 contains the data transfer rates of channels that can be established with the first and the second wireless terminals 110 and 120. In the following description, it is assumed that the data transfer rate of a channel that can be established between the wireless access point 100 and the first wireless terminal 110 is 54 Mbps as shown in FIG. 3. It is also assumed that the data transfer rate of a channel that can be established between the wireless access point 100 and the second wireless terminal 120 is 6 Mbps as shown in FIG. 3. In the prior art, if data to be transmitted to the second wireless terminal 120 occurs in the wireless access point 100, the data frame transmission to the second wireless terminal 120 is performed at the transfer rate of 6 Mbps. However, in the present invention, the wireless access point 100 requests information relating to reliable nodes from the second wireless terminal 120 if the access point 100 detects that the second terminal 120 has a specific transfer rate at or less than a threshold. The term "reliable nodes" refers to other wireless nodes that can communicate with the second wireless terminal 120. Thus, according to the present invention, each wireless terminal needs to store information of the other wireless terminals that can communicate with each terminal and information related to the transfer rates at which each terminal can communicate with the other wireless terminals. In response to the reliable node information request signal, the second wireless terminal 120 produces and transmits a data frame containing the information of its reliable nodes to the wireless access point 100. Then, the wireless access point 100 according to the present invention calculates the highest transfer rate from among all of the transfer rates at which it can transmit data to the second wireless terminal 120 via other nodes (i.e. its reliable nodes). In other words, the wireless access point 100 calculates the highest transfer rate of data transmission to the second wireless terminal 120 as its destination via a wireless terminal (i.e. a specific reliable node) different from the second wireless terminal 120. If the calculated transfer rate indicates that the data frame transmission via the specific reliable node has a transmission rate greater than the transmission rate of the direct transmission from the wireless access point 100 to the second wireless terminal 120, the wireless access point 100 transmits the data to the second wireless terminal 120 as its destination via the specific reliable node. For example, ST1 110 can transmit data to ST2 120 at a ratio of 54 Mbps, which is greater than the 6 Mbps that AP100 can transmit to ST2 120 at, thus AP100 of the present invention would transmit data to ST2 120 through ST1 110.

Figure 4:
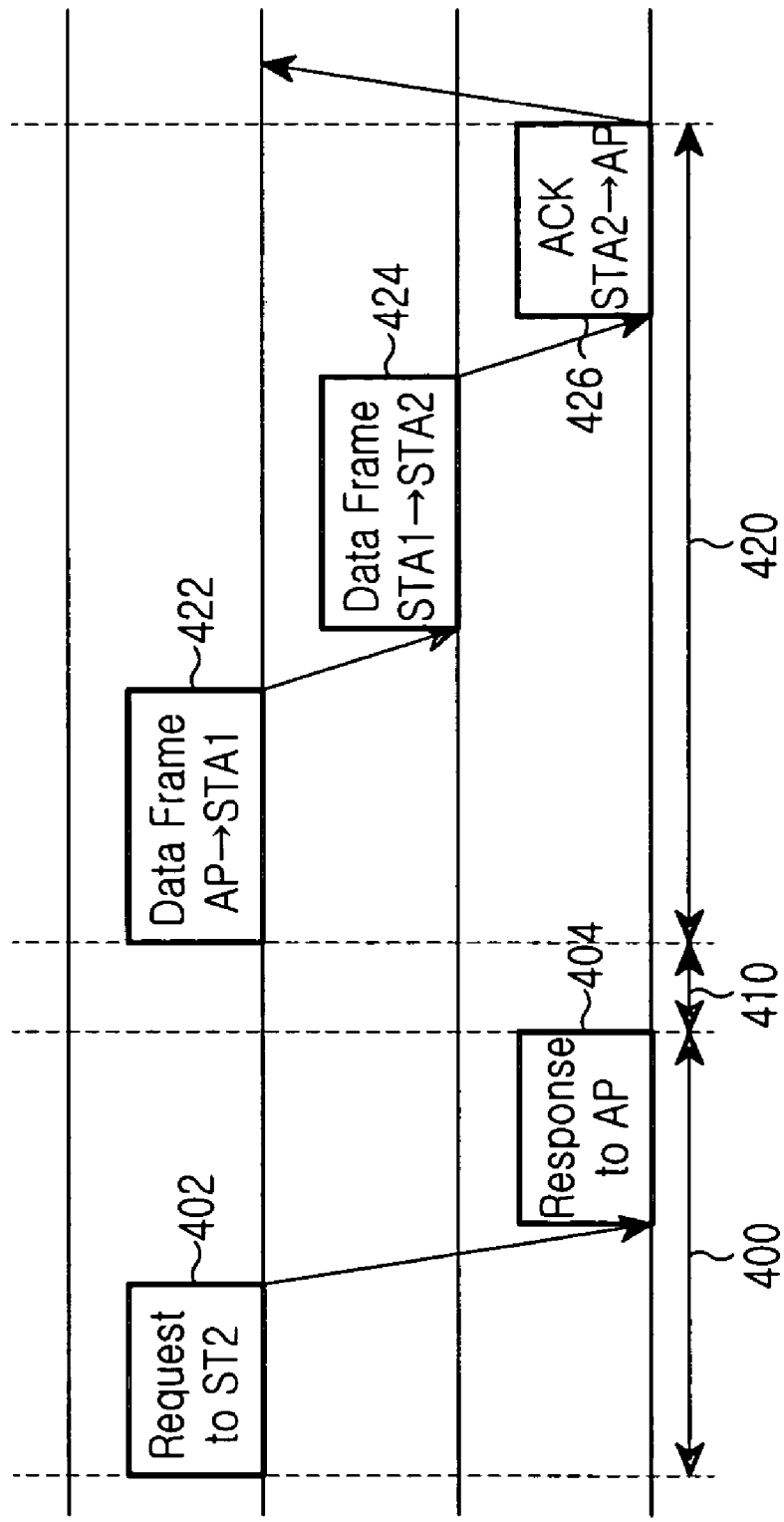
FIG. 4 is a timing diagram illustrating the flow of data transmission for searching for a relay path and relaying data when a relay data transmission is needed according to a preferred embodiment of the present invention.

FIG. 4 is a timing diagram illustrating the flow of the data transmission for searching for a relay path and relaying data when relay data transmission is needed according to a preferred embodiment of the present invention. A detailed description of the relay path search and the relay data transmission will now be described in detail with reference to FIG. 4.

The procedure shown in FIG. 4 includes three main steps 400, 410 and 420. As an overview, at step 400, the wireless access point 100 requests a destination wireless terminal to search for a path via which it can transmit data to the destination wireless terminal at the highest transfer rate, and receives a response signal to the request. At step 410, based on information included in the response signal received from the destination terminal, the wireless access point 100 determines an optimal path for transmitting the data to the destination wireless terminal. At step 420, the wireless access point 100 transmits a data frame to the destination wireless terminal via the determined optimal path. To illustrate a relay gain according to the present invention, the data frame transmission of step 420 is shown in FIG. 4 with reference to relay frame transmission.

First, will be described how the request to search for the path and the receipt of a response thereto is performed at step 400. If the need to transmit data to the second wireless terminal 120 arises and a channel that can be established with the second wireless terminal 120 can transmit at a transfer rate equal to or less than a predetermined transfer rate, the wireless access point 100 generates a reliable node information request data frame and transmits it to the second wireless terminal 120 at step 402. In response to the request data frame, the second wireless terminal 120 generates and transmits, at step 404, a reliable node information data frame containing information of other wireless terminals with which the second wireless terminal 120 can communicate wirelessly and information of transfer rates at which the second wireless terminal 120 can communicate with the other wireless terminals, as described above.

Thereafter, the wireless access point 100 determines an optimal relay path at step 410. The optimal relay path determination will be described below in detail with reference to the flow chart of FIG. 7.

Next, will be described how the data relay is performed at step 420. If it is determined that data transmission to the second wireless terminal 120 is to be performed via a relay path through the first wireless terminal 110, the wireless access point 100 produces a data frame to be transmitted to the second wireless terminal 120 and transmits the data frame to the first wireless terminal 110 at step 422. A tunneling technique used in the IP communication may be used to transmit the data frame destined for the second wireless terminal 120 to the first wireless terminal 110. At step 424, STA1 110 transmits the data frame to STA2 120. To accomplish this, the data frame transmitted to the first wireless terminal 110 includes two headers (i.e. a first and a second header), followed by data and two fields indicating the end of the data. The structure of this data frame can be expressed by Table 1 as follows.

TABLE 1

| Header 1 | Header 2 | DATA | FCS2 | FCS1 |
|---|---|---|---|---|

The first header "Header 1" includes a source address (SA) and a destination address (DA) indicating the address of a relay terminal (the first wireless terminal 110 in this example), and data type information indicating that the data frame to be transmitted is a relay frame. The second header "Header 2" includes a source address and a destination address indicating the address of a terminal as the actual destination of the data, and data type information indicating the type of the data to be transmitted. The field "FCS1" includes a flag indicating the end of data corresponding to the first header and the field "FCS2" includes a flag indicating the end of data corresponding to the second header. The wireless access point 100 constructs the data frame in this manner and transmits it to the first wireless terminal 110. By checking the first header of the received frame, the first wireless terminal 110 can determine that the frame is a relay data frame. The first wireless terminal 110 removes the first header and the flag indicating the end of the data corresponding to the first header from the received data frame, and then transmits the data frame to the second wireless terminal 120. The structure of the data frame transmitted from the first wireless terminal 110 to the second wireless terminal 120 can be expressed by Table 2 as follows.

TABLE 2

| Header2 | DATA | FCS2 |
| --- | --- | --- |

This is the data frame the wireless access point 100 originally intends to transmit to the second wireless terminal 120. As a result, the second wireless terminal 120 can receive the data frame in a short time. From the header of the received data frame, the second wireless terminal 120 can obtain the data type information of the received data, and the source address (i.e. the origination address) and the destination terminal address of the received data. After error checking the received data, the second wireless terminal 120 produces a response signal to the data frame transmitted from the wireless access point 100, and transmits the response signal to the wireless access point 100 at step 426.

Figure 5:
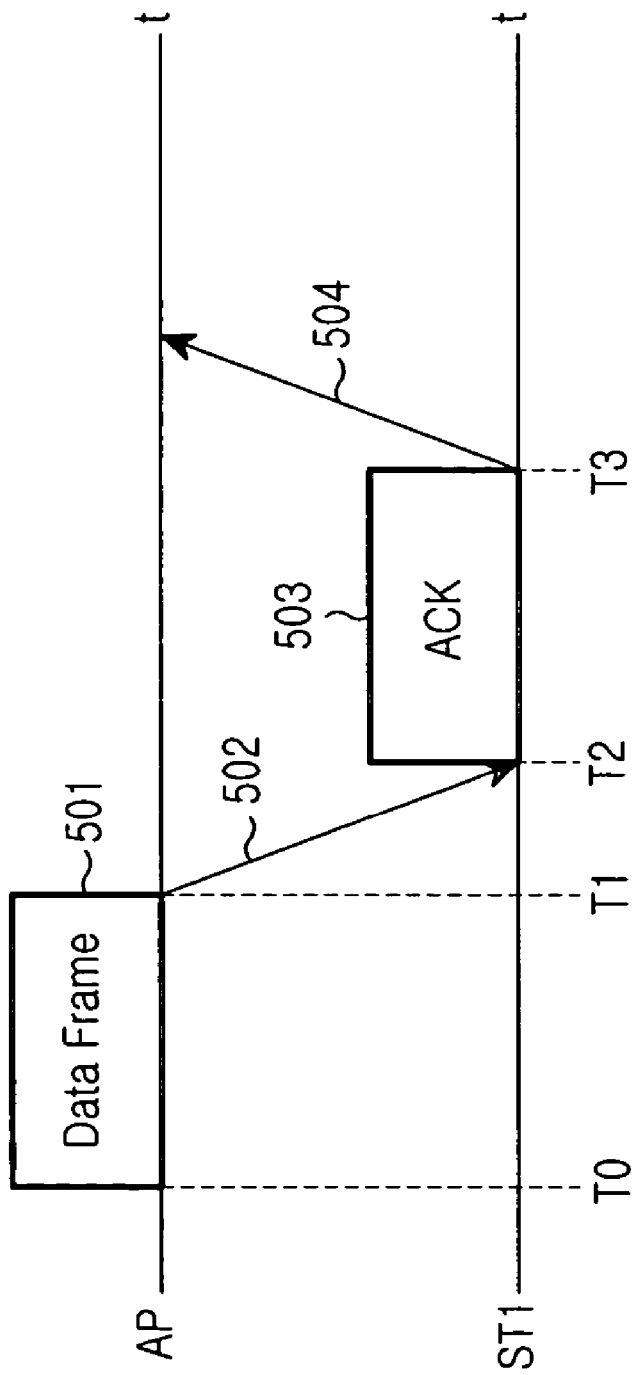
FIG. 5 is a timing diagram illustrating the transmission of a data frame and a response signal thereto in a wireless LAN in the prior art.

FIG. 5 is a timing diagram illustrating transmission of a data frame and a response signal thereto in a wireless LAN in the prior art. A description of the data frame and response signal transmission in the prior art will now be described with reference to FIG. 5. Generally, an access point 100 constructs from time T0 to T1 a data frame to be transmitted to a first wireless terminal 110 at step 501, and then transmits the data frame to the first wireless terminal 110 from time T1 to T2 at step 502. After error checking the data frame received from the access point 100, the first wireless terminal 110 produces a response signal to the data frame from time T2 to T3 at step 503, and transmits the response signal to the access point 100 at step 504. The wireless terminal may need some processing time between the data frame reception and the response signal transmission, and there may also exist a guard interval for the response signal. However, the description of FIG. 5 has been given without regard to such time intervals.

In the prior art, the access point 100 must receive the response signal after transmitting the data frame in the wireless LAN as described above. However, in the present invention, the first wireless terminal 110 does not transmit a response signal to the access point 100 after receiving the data frame therefrom in the data relay procedure of step 420. The first wireless terminal 110 may produce and transmit the response signal to the received data frame to the access point 100 as in the prior art. However, the transmission of the response signal from the first wireless terminal 110 may cause a time delay, making high-speed data processing difficult. For this reason, according to the present invention, if the wireless access point 100 detects that the first wireless terminal 110 has transmitted data, which is to be transmitted from the access point 100 to the second wireless terminal 120, to the second wireless terminal 120 after removing a header and a flag of the data required for the relaying based on the tunneling technique, the access point 100 assumes that it has received the response signal. Indeed, in the present invention, the response signal is transmitted from the second wireless terminal 120 to the access point 100.

Figure 6:
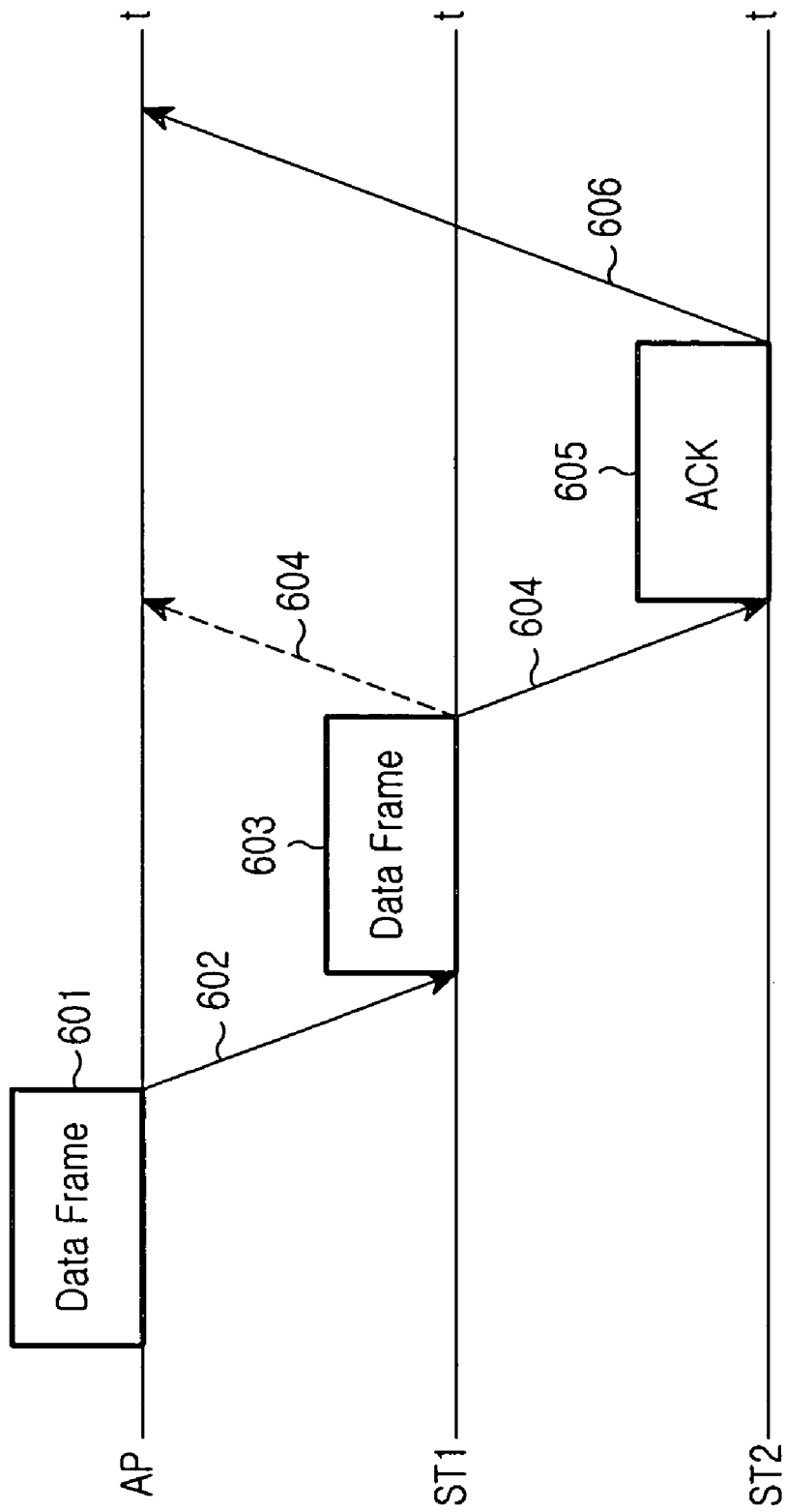
FIG. 6 is a timing diagram illustrating the data frame transmission and the response frame transmission when the data frame is relayed according to the present invention.

With reference to FIG. 6, a description will now be given of how the response signal to the data frame relayed in the above manner is transmitted according to the present invention. FIG. 6 is a timing diagram illustrating the data frame transmission and the response frame transmission when the data frame is relayed according to the present invention.

The wireless access point 100 produces a data frame 601 to be transmitted to the second wireless terminal 120 and transmits the data frame 601 to the first wireless terminal 110 at step 602. The data frame 601 produced by the wireless access point 100 is configured as expressed by the above Table 1. The first wireless terminal 110 produces a data frame 603 by removing a first header and a flag corresponding thereto from the data frame received from the access point 100, and relays and transmits the produced data frame 603 to the second wireless terminal 120 at step 604. The data frame 603 transmitted from the first wireless terminal 110 to the second wireless terminal 120 is configured as expressed by the above Table 2. Since the data frame 603 is wirelessly transmitted, the data frame 603 is transmitted not only to the second wireless terminal 120 but also to the wireless access point 100 at the same time at step 604. The transmission of the data frame 603 to the access point 100 at step 604 is denoted by a dotted line in FIG. 6. If the wireless access point 100 receives the data frame 603, the wireless access point 100 assumes that it receives a response signal to the transmission of the data frame 601, which is different from the prior art in which the wireless access point 100 directly receives the response signal. The data frame 603 configured as expressed by the above Table 2 is in turn transmitted from the first wireless terminal 110 to the second wireless terminal 120. The second wireless terminal 120 can detect a source header of the data frame 603, and thus detect that the node from which the data frame 603 is originally transmitted is the wireless access point 100.

If there is no error in the received data frame configured as expressed by Table 2, the second wireless terminal 120 produces a response signal 605, and transfers the produced response signal 605 to the wireless access point 100 at step 606. The response signal 605 is the same as the above response signal in the prior art. The response signal 605 does not need to be relayed since the response signal is a very small amount of data and the relay of the response signal is less effective than the direct transmission thereof. According to the present invention, it is possible to increase the transfer rate of the data frame since the first wireless terminal 110, acting as a relay node, does not transmit the unnecessary response signal to the wireless access point 100. It is also possible to effectively utilize resources available in the wireless LAN.

Figure 7:
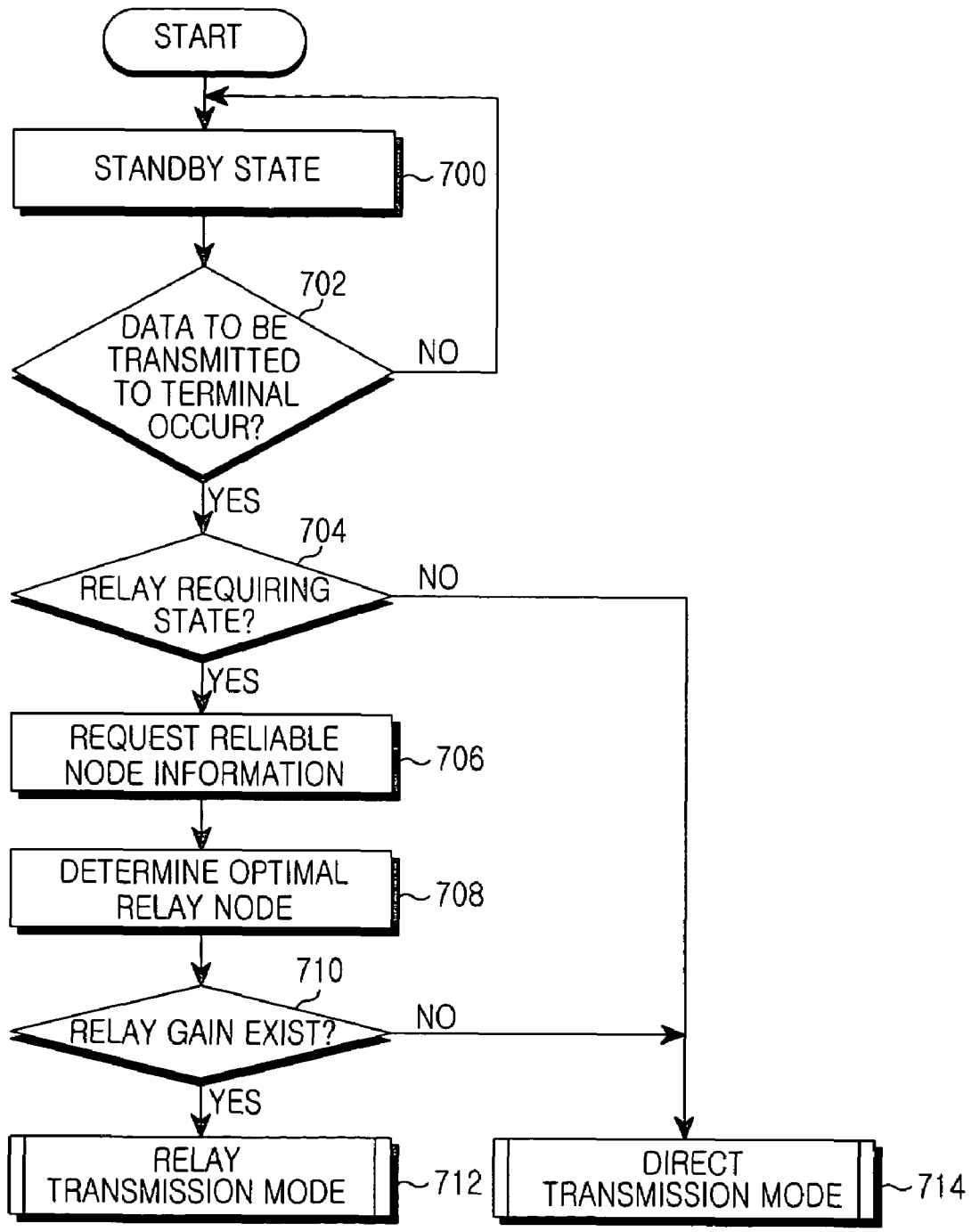
FIG. 7 is a flow chart illustrating how a wireless access point operates when it needs to transmit a data frame to a specific wireless terminal, according to a preferred embodiment of the present invention.

FIG. 7 is a flow chart illustrating how the wireless access point 100 operates when it needs to transmit a data frame to a specific wireless terminal, according to a preferred embodiment of the present invention. With reference to FIG. 7, a detailed description will now be given of the operation of the wireless access point 100 according to the present invention when the need to transmit a data frame to a specific wireless terminal arises. The operation of FIG. 7 can be performed by the scheduler 211 of the wireless access point 100 or by a controller (not shown) thereof. Alternatively, the operation of FIG. 7 may be divided into steps performed by the scheduler 211 and steps performed by the controller. The exact configuration depends on how the system is designed and the description of the present invention will be given based on the wireless access point 100 without regard to the scheduler or controller.

The wireless access point 100 maintains a standby state at step 700. Here, the standby state is a general term referring to the state of waiting for receipt of a data frame from a specific wireless terminal or the state of waiting for the occurrence of data to be transmitted to a specific wireless terminal. While maintaining the standby state, the wireless access point 100 moves to step 702 to determine if data to be transmitted to a terminal occurs. If the determination result at step 702 is that data to be transmitted to a specific wireless terminal has occurred, the wireless access point 100 moves to step 704. At step 704, the wireless access point 100 determines if the specific wireless terminal, to which the occurred data is to be transmitted, is in a relay requiring state in which the transfer rate of a channel that can be established between the wireless access point 100 and the specific wireless terminal is equal to or less than a predetermined transfer rate.

For example, let us assume that the wireless access point 100 can have transfer rates of 6 Mbps, 9 Mbps, 12 Mbps, 18 Mbps, . . . , 48 Mbps and 54 Mbps. If the transfer rate of a channel that can be currently established between the wireless access point 100 and a specific wireless terminal to which data is to be transmitted is 18 Mbps or less, transmission of the data to the specific wireless terminal via a relay node may bring a gain. For example, let us also assume that data to be transmitted to the second wireless terminal 120 occurs in the wireless access point 100, and the transfer rate of a channel that can be established between the wireless access point 100 and the second wireless terminal 120 is 18 Mbps. It is also assumed that the transfer rate of a channel that can be established between the first wireless terminal 110 and the second wireless terminal 120 is 54 Mbps and the transfer rate of a channel that can be established between the first wireless terminal 110 and the wireless access point 100 is 54 Mbps. If the data of two frames is transmitted from the wireless access point 100 to the second wireless terminal 120, the transfer rate can be assumed to be 36 Mbps. However, if the data is transmitted from the wireless access point 100 to the second wireless terminal 120 via the first wireless terminal 110 according to the present invention, the transfer rate can be assumed to be 54 Mbps during the two frames. This is a considerable gain, even taking into account the time required for a relay path search request, and the time required to process the response signal to the request, and the delay time and the over-header occurring during the transmission from the wireless access point 100 to the second wireless terminal 120 via the first wireless terminal 110.

As described above, if the transfer rate of a channel that can be established between the wireless access point 100 and a specific wireless terminal is equal to or less than the predetermined transfer rate, the wireless access point 100 detects that the specific wireless terminal (the second wireless terminal 120 in this example) is in the relay requiring state. On the other hand, if the transfer rate is greater than the predetermined transfer rate, the wireless access point 100 detects that the specific wireless terminal is not in the relay requiring state in which no relay gain occurs. Accordingly, at step 704, the wireless access point 100 determines if a specific wireless terminal to which a current frame is to be transmitted is in the relay requiring state, by comparing the predetermined transfer rate with the transfer rate of a channel that can be established between the wireless access point 100 and the specific wireless terminal. If the determination result at step 704 is that the specific wireless terminal is in the relay requiring state, the wireless access point 100 moves to step 706; otherwise it moves to step 714 and conducts direct transmission.

At step 706, the wireless access point 100 produces and transmits a reliable node information request data frame to the specific wireless terminal as described above in FIG. 4. If the wireless access point 100 receives a response signal from the specific wireless terminal as described above in FIG. 4, the wireless access point 100 determines an optimal relay node. The procedure and reason for determining the optimal relay node will now be described.

Let us assume that the specific wireless terminal to which the data frame is to be transmitted is the second wireless terminal 120. There may be one or more wireless terminals that can communicate with the second wireless terminal 120. In response to the reliable node information request data frame transmitted from the wireless access node 100, the second wireless terminal 120 produces and transmits a response signal that contains information of all other wireless terminals that can communicate with the second wireless terminal 120 and information of the transfer rates of channels that can be established between the wireless access node 100 and all the other wireless terminals. For example, let us assume that the second wireless terminal 120 can communicate with the first wireless terminal 110 and the third wireless terminal 130, and the transfer rate of a channel that can be established with the first wireless terminal 110 is 36 Mbps, and the transfer rate of a channel that can be established with the third wireless terminal 130 is 54 Mbps. In this case, it is most effective for the second wireless terminal 120 to receive data via the third wireless terminal 130. However, the receipt of data via the third wireless terminal 130 may or may not produce a gain depending on the type of a channel that can be established between the third wireless terminal 130 and the access point 100. Accordingly, the second wireless terminal 120 produces and transmits a response signal containing information of its reliable nodes and transfer rates of channels that can be established with the reliable nodes.

At step 708, the wireless access point 100 then determines an optimal relay node. The optimal relay node for a specific wireless terminal as a destination node is determined based on first transfer rates of channels that can be established between the wireless access point 100 and reliable nodes of the specific wireless terminal, and is also based on second transfer rates of channels that can be established between the reliable nodes and the specific wireless terminal. One of the simplest methods is to determine a reliable node, which has the greatest sum of the first and second transfer rates, to be the optimal relay node. Another method is to determine a reliable node, which has the greatest product of the first and second transfer rates, to be the optimal relay node. In other words, at step 708, the wireless access point 100 determines transmission through which a reliable node will produce the greatest gain. The determination must be based on both the transfer rates between the wireless access point 100 and the reliable nodes and the transfer rates between the reliable nodes and the destination node.

After determining the optimal reliable node in such a manner, the wireless access point 100 moves to step 710 to determine if the selection of a relay node will cause a relay gain. This determination may be performed based on the calculation of a relay transfer rate of data frame transmission via each reliable node and an actual transfer rate of direct data frame transmission from the wireless access point 100 to the destination wireless terminal. The determination as to whether or not the relay node selection will cause a relay gain may also be performed based on a gain table previously provided as shown in Table 3.

TABLE 3

| Relay Channel | Existing Channel | | | |
| --- | --- | --- | --- | --- |
| | 6 Mbps | 9 Mbps | 12 Mbps | 18 Mbps |
| 54 Mbps, 54 Mbps | 139 | 236 | 388 | 961 |
| 54 Mbps, 48 Mbps | 139 | 250 | 400 | 1096 |
| 54 Mbps, 36 Mbps | 148 | 277 | 478 | 1933 |
| 54 Mbps, 24 Mbps | 169 | 344 | 772 | |
| 54 Mbps, 18 Mbps | 193 | 479 | 1912 | |
| 54 Mbps, 12 Mbps | 277 | 1910 | | |
| 54 Mbps, 9 Mbps | 478 | | | |
| 48 Mbps, 48 Mbps | 139 | 254 | 424 | 1267 |
| 48 Mbps, 36 Mbps | 151 | 281 | 514 | 2563 |
| 48 Mbps, 24 Mbps | 172 | 367 | 856 | |
| 48 Mbps, 18 Mbps | 199 | 515 | 2569 | |
| 36 Mbps, 36 Mbps | 157 | 317 | 640 | |
| 36 Mbps, 24 Mbps | 184 | 425 | 1288 | |

TABLE 3-continued

| Relay Channel | Existing Channel | | | |
|---|---|---|---|---|
| | 6 Mbps | 9 Mbps | 12 Mbps | 18 Mbps |
| 36 Mbps, 18 Mbps | 211 | 641 | | |
| 36 Mbps, 12 Mbps | 319 | | | |
| 24 Mbps, 24 Mbps | 211 | 632 | | |
| 24 Mbps, 18 Mbps | 256 | 1280 | | |
| 24 Mbps, 12 Mbps | 427 | | | |
| 18 Mbps, 18 Mbps | 319 | | | |
| 18 Mbps, 12 Mbps | 643 | | | |

Each pair of relay channel values is the transfer rate of a relay channel between the wireless access point 100 and the reliable node and the other is the transfer rate of a relay channel between the reliable node and the destination node (i.e. the destination wireless terminal). The four existing channel values are the transfer rates of channels that can be currently established between the wireless access point 100 and the destination wireless terminal. For each pair of relay channel transfer rates and each existing channel transfer rate, a corresponding gain can be achieved as shown in Table 3. In Table 3, each gain is expressed in units of bytes. The gain table of Table 3 is illustrated as an example. Different gains from those of Table 3 may be actually obtained depending on how the system is embodied.

If the determination of step 710 is that the relay node selection will cause a relay gain, the wireless access point 100 moves to step 712 to perform the relay transmission mode as described above in FIG. 6. However, if the determination of step 710 is that the relay node selection will cause no relay gain, the wireless access point 100 moves to step 714 to perform the direction transmission mode as in the prior art. In this manner, the relay transmission is performed only when it produces a relay gain, which increases transmission efficiency.

Figure 8:
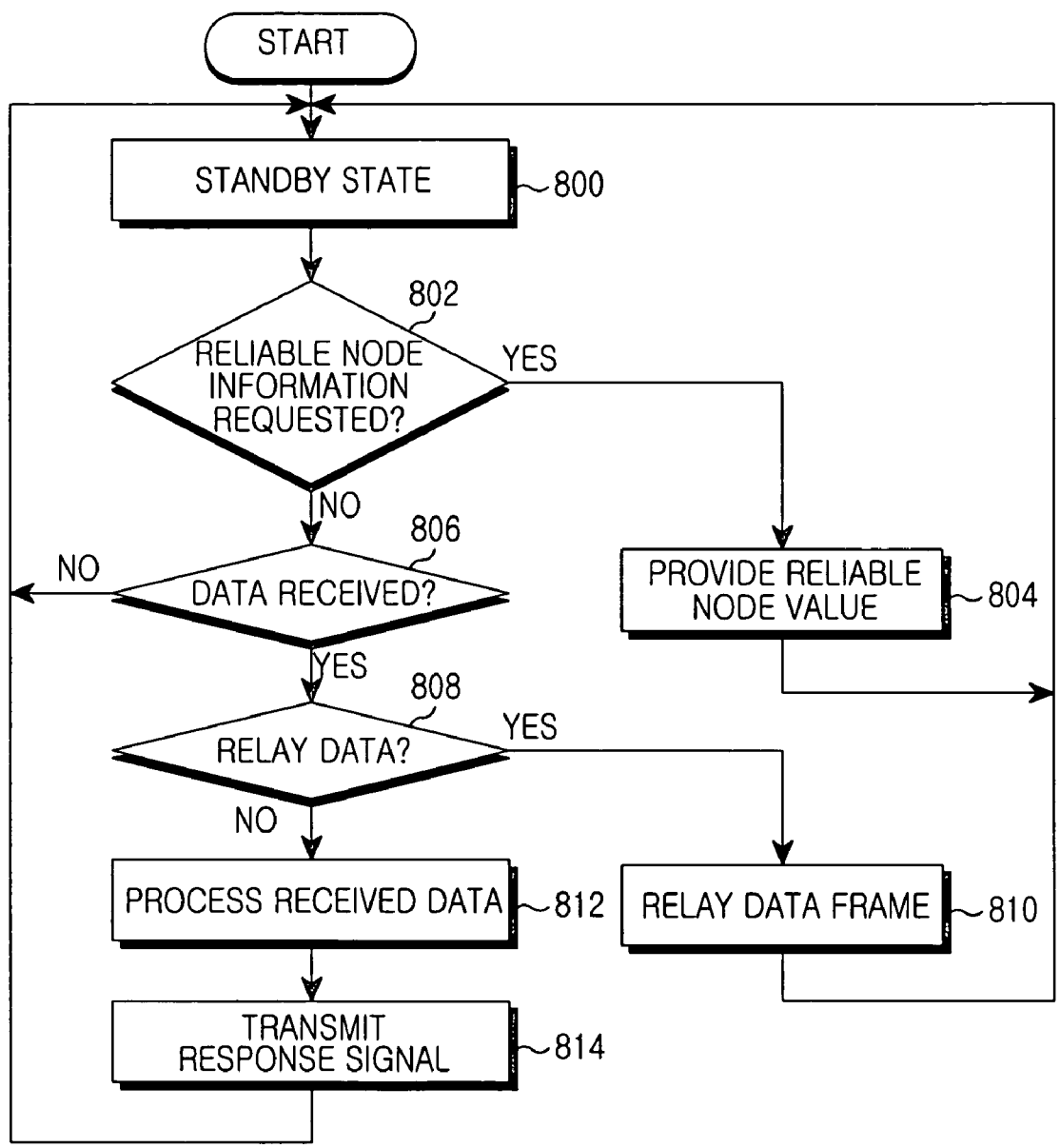
FIG. 8 is a flow chart illustrating how a wireless terminal operates to receive a data frame and provide a reliable node information frame according to a preferred embodiment of the present invention.

FIG. 8 is a flow chart illustrating how a specific wireless terminal operates to receive a data frame and provide a reliable node information frame according to a preferred embodiment of the present invention. The operation of the specific wireless terminal for receiving a data frame according to the preferred embodiment of the present invention will now be described in detail with reference to FIG. 8. Although the following description is given under the assumption that the specific wireless terminal is the first wireless terminal 110, it is natural that all wireless terminals operate in the same manner as shown in FIG. 8.

The first wireless terminal 110 maintains a standby state at step 800. Here, the standby state is a general term referring to the state of waiting for the occurrence of data to be transmitted, the state of waiting for receipt of data from another wireless terminal, or the state of waiting for receipt of a data frame from the wireless access point 100. While maintaining the standby state, the first wireless terminal 110 moves to step 802 to determine if a reliable node information is requested. If the determination result at step 802 is that the reliable node information is requested, the first wireless terminal 110 moves to step 804; otherwise it moves to step 806. For example, the first wireless terminal 100 moves to step 804 when it receives a reliable node value request from the wireless access point 100 as in step 400 of FIG. 4. At step 804, the first wireless terminal 110 produces, as a response frame to the reliable node information request, a reliable node information frame that contains-information of all other wireless terminals that can communicate with the first wireless terminal 110 and information of the transfer rates of channels that can be established between the first wireless terminal 110 and all the other wireless terminals, and provides the reliable node information frame to the wireless access point 100.

If the determination result at step 802 is that no reliable node information is requested, the first wireless terminal 110 moves to step 806 to determine if it receives a data frame from the wireless access point 100 or from another wireless terminal. If the determination result at step 806 is that a data frame is received, the wireless access point 100 moves to step 808; otherwise it returns to step 800 to enter the standby state. At step 808, the first wireless terminal 110 determines if the received data frame is a relay data frame. This determination may be performed based on a data type value included in a header of the received data frame as described above.

If the received data frame is a relay data frame, the first wireless terminal 110 moves to step 810 to perform relaying of the received data frame. The term "relaying" refers to a process of converting a received data frame with a structure as shown in Table 1 to a data frame with a structure as shown in Table 2 and transmitting the converted data frame to a destination wireless terminal. After performing the relaying, the first wireless terminal 110 returns to step 800.

On the other hand, if the determination result at step 808 is that the received data frame is not a relay data frame, the first wireless terminal 110 moves to step 812 to perform reception processing, such as error checking, of the received data frame, and then moves to step 814 to produce and transmit a response signal to a node from which the received data frame was transmitted. The procedure of FIG. 8 as described above allows each wireless terminal to receive and process both a relay data frame and a data frame that was destined for the wireless terminal.

As apparent from the above description, the present invention provides a method for transmitting frames at a high rate in a wireless LAN that has the following features and advantages. If a channel established with a specific node has a low transfer rate in the wireless LAN, a data frame is transmitted and received to and from the specific node by relaying the frame via a relay node, provided that the relaying produces a transfer rate gain. This achieves effective utilization of wireless resources. It is also possible to prevent data to be transmitted from overflowing in a wireless access point, thereby increasing the data transfer rate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for transmitting data in a wireless local area network, the method comprising the steps of:
   a) requesting, by a wireless access point, transmission of information related to reliable nodes to a wireless terminal having a transfer rate less than a predetermined threshold if data to be transmitted to the wireless terminal occurs in the wireless access point, the reliable nodes being other wireless terminals that can communicate with the wireless terminal and the wireless access point;
   b) producing, by the wireless terminal, a reliable node information frame containing both information related to reliable nodes capable of communicating with the wireless terminal over a wireless channel and information related to greatest allowable first transfer rates between the reliable nodes and the wireless terminal, and transmitting the reliable node information frame from the wireless terminal to the wireless access point;

c) determining, by the wireless access point, an optimal relay node selected from the reliable nodes, based on greatest allowable second transfer rates between the reliable nodes and the wireless access point and based on the greatest allowable first transfer rates between the reliable nodes and the wireless terminal, and determining if a relay gain exists; and d) performing relay transmission from the wireless access point to the wireless terminal if the relay gain exists, and performing direct transmission from the wireless access point to the wireless terminal if no relay gain exists.

2. The method according to claim 1, wherein step c) further includes the steps of:

comparing a transfer rate of direct transmission to the wireless terminal with an actual transfer rate of relay transmission to the wireless terminal via the optimal relay node; and determining if the relay gain exists, based on the transfer rate comparison.

3. The method according to claim 1, further comprising the step of:

e) analyzing, by a wireless terminal, a header of a data frame if the wireless terminal receives the data frame, to determine if the received data frame is a relay data frame, and deleting a header and a flag for relaying from the received data frame if the received data frame is a relay data frame, and then transmitting the data frame to a corresponding destination node.

4. The method according to claim 1, wherein if a relay node relays a frame to be transmitted during the relay transmission, the wireless access point assumes that the wireless access point has received a response signal from the relay node.

5. The method according to claim 1, wherein step c) further includes the steps of:

selecting a reliable node providing a highest transfer rate from the wireless access point to a destination terminal from among the reliable nodes, based on the greatest allowable second transfer rates between the wireless access point and the reliable nodes and based on the greatest allowable first transfer rates from the reliable nodes to the destination terminal; and determining the selected reliable node to be the optimal relay node.

6. A method for transmitting a data frame by a wireless access point in a wireless local area network including the wireless access point and a plurality of wireless terminals, said wireless access point capable of transmitting a data frame to the plurality of wireless terminals over wireless channels, the method comprising the steps of:

a) requesting information related to reliable nodes from a wireless terminal having a transfer rate less than a predetermined threshold if data to be transmitted to the wireless terminal occurs, the reliable nodes being other wireless terminals that can communicate with the wireless terminal and the wireless access point;

b) determining, upon receipt of a reliable node information frame as a response signal from the wireless terminal, an optimal relay node from among the reliable nodes, based on greatest allowable second transfer rates between the reliable nodes and the wireless access point, and based on greatest allowable first transfer rates between the reliable nodes and the wireless terminal;

c) comparing relay transmission to the wireless terminal via the optimal relay node with direct transmission to the wireless terminal to determine if a relay gain exists; and d) performing relay transmission to the wireless terminal if the relay gain exists, and performing direct transmission to the wireless terminal if no relay gain exists.

7. The method according to claim 6, wherein step b) further includes the steps of:

calculating the greatest allowable second transfer rates between the wireless access point and the reliable nodes included in the received reliable node information frame;

selecting a reliable node providing a greatest transfer rate from the wireless access point to a destination terminal from among the reliable nodes, based on the calculated greatest allowable second transfer rates and based on the greatest allowable transfer rates from the reliable nodes to the destination terminal; and determining the selected reliable node to be the optimal relay node.

8. The method according to claim 6, wherein step c) includes the steps of:

comparing a transfer rate of a direct transmission to the wireless terminal with an actual transfer rate of a relay transmission to the wireless terminal via the optimal relay node; and determining if the relay gain exists, based on the transfer rate comparison.

9. The method according to claim 6, wherein if a relay node relays a frame to be transmitted during the relay transmission, the wireless access point assumes that the wireless access point has received a response signal from the relay node.

* * * * *